Fig. 1
Fig. 2
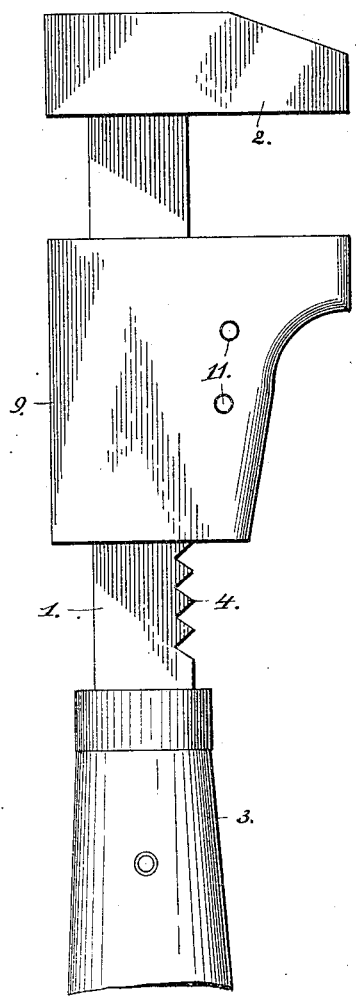
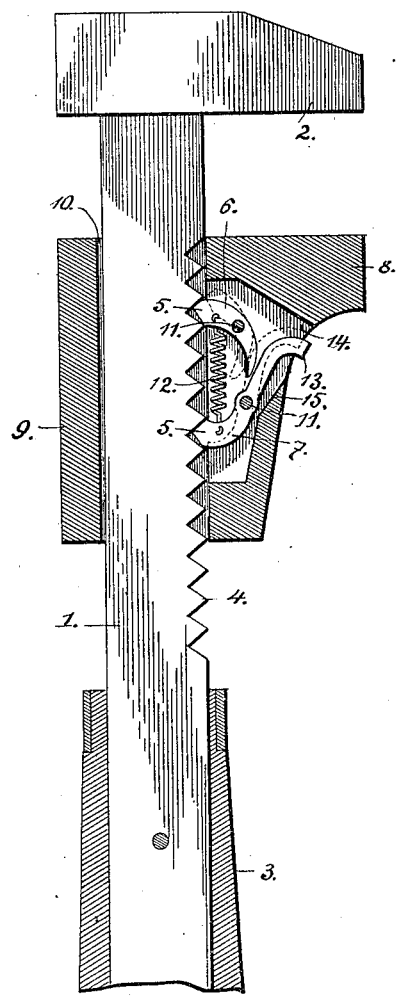
Witnesses:
A. H. Rabrag
R. H. Butler
Inventors
Theodor Geese
Markus Holpfer
By H. C. Everts Co.
Attorneys

UNITED STATES PATENT OFFICE.

MARCUS HOLPFER, OF CORAOPOLIS, AND THEODOR GEESE, OF ALLEGHENY, PENNSYLVANIA.

WRENCH.

No. 839,762.  Specification of Letters Patent.  Patented Dec. 25, 1906.

Application filed September 4, 1906. Serial No. 333,282.

*To all whom it may concern:*

Be it known that we, MARCUS HOLPFER, a subject of the Emperor of Austria-Hungary, residing at Coraopolis, and THEODOR GEESE, a subject of the German Emperor, residing at Allegheny, in the county of Allegheny and State of Pennsylvania, have invented certain new and useful Improvements in Wrenches, of which the following is a specification, reference being had therein to the accompanying drawings.

This invention relates to wrenches; and its primary object is to provide a device of this character of simple and inexpensive construction which may be quickly adjusted to engage a nut or other object.

A further object of the invention is to provide a wrench with a housing to inclose the spring-dogs which secure the movable jaw to the shank, so that in case the wrench is dropped or thrown down the dogs will not be injured or disengaged from the shank.

The construction of the improvement will be fully described hereinafter in connection with the accompanying drawings, which form a part of this specification, and its novel features will be defined in the appended claims.

In the drawings, Figure 1 is a side elevation of a wrench embodying the invention, and Fig. 2 is a vertical sectional view of the same.

The reference-numeral 1 designates the shank of the wrench; provided at one end with the usual fixed jaw 2 and at its opposite end with a handle 3. One edge of the shank is formed with a series of triangular teeth 4, adapted to be engaged by the oppositely-beveled ends 5 of two oppositely-disposed dogs 6 and 7. The movable jaw 8 of the wrench is formed integral with a housing 9, having an opening 10, through which the shank 1 extends. The two dogs 6 and 7 are pivotally secured between the walls of the housing below the movable jaw 8 by cross-pins 11, and between said dogs is interposed a coil-spring 12, the ends of which are connected, respectively, one to each of the dogs, as shown in Fig. 2. The lower dog 7 is formed with an upwardly and outwardly curved extension 13, projecting through an opening 14 in the housing below the movable jaw and serving as a finger-piece for disengaging the two dogs from the shank. The outer end of the upper dog 6 is curved downward to adapt it to contact with the extension 13 of the lower dog when the latter is pushed inward.

The utility and operation of the device will be readily understood. The tension of the spring holds the oppositely-disposed dogs normally in engagement with the shank, the spaces between the teeth 4 corresponding to the shape of the oppositely-beveled ends of said dogs. By pressing upon the extended end 13 of the lower dog the inner end of said dog is withdrawn from between the teeth of the shank, and the pressure of the extension 13 upon the curved outer end of the dog 6 also withdraws the latter from its engagement with the shank, thus permitting the housing and movable jaw to be adjusted to any desired position with relation to the fixed jaw. It is obvious that the pressure upon the lower dog will expand the spring and that the contraction of the spring when the dog 7 is relieved of pressure will cause the dogs to reëngage the shank. The lower wall 15 of the opening 14 in the housing is inclined, as shown, to permit of the required movement of the extended end of the dog 7. It will be noted that the two dogs 6 and 7 and their controlling-spring are protected within the housing, and hence are not exposed to injury when the wrench is thrown down or accidentally dropped.

Having fully described our invention, what we claim as new, and desire to secure by Letters Patent, is—

1. A wrench comprising a shank formed with triangular teeth along one edge, and having a fixed jaw at one end, a housing provided with an integral movable jaw, and an opening for the passage of the shank, and a pair of oppositely-disposed dogs beveled on their inner ends to fit the spaces between the teeth of the shank, and one of said dogs having an extension serving as a finger-piece, and a spring interposed between said dogs.

2. In a wrench, the combination with a shank formed with triangular teeth, and provided at one end with a fixed jaw, of a housing slidably supported on said shank, and having an integral jaw, two oppositely-disposed dogs pivotally secured within the housing, and having their inner ends oppositely beveled, one of said dogs having an extension projecting through an opening in the housing below the jaw thereof, and a spring having its ends secured to said dogs.

In testimony whereof we affix our signatures in the presence of two witnesses.

MARCUS HOLPFER.
THEODOR GEESE.

Witnesses:
MAX H. SROLOVITZ,
A. J. TRIGG.